United States Patent Office 3,342,777
Patented Sept. 19, 1967

3,342,777
ADDITION COPOLYMERS OF POLYFLUOROKETONES AND ETHYLENIC COMPOUNDS
Edward George Howard, Jr., Hockessin, Del., assignor to E. I. du Pont de Nemours and Company, Wilmington, Del., a corporation of Delaware
No Drawing. Filed Apr. 28, 1964, Ser. No. 363,262
21 Claims. (Cl. 260—63)

ABSTRACT OF THE DISCLOSURE

Addition copolymers, including terpolymers, of a polyfluoroketone, e.g., perfluoroacetone, and an ethylenic compound, e.g., ethylene and/or tetrafluoroethylene, useful, for example, as solids in making films, and their preparation by direct reaction of the monomers in the presence of a free radical generating initiator such as an organic peroxide.

---

This application is a continuation-in-part of my application, Serial No. 277,693, filed May 3, 1963, and now abandoned.

This invention relates to, and has as its principal objects provision of, novel addition copolymers of a polyfluoroketone with a polymerizable ethylenically unsaturated compound, manufactures made from the polymers, and the preparation of the same.

Specifically, the novel compositions of this invention are the addition copolymers of (a) at least one polyfluoroketone of the general formula

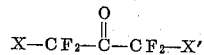

and (b) at least one ethylenic compound of the formula $ZZ'C=CYY'$ susceptible of polymerization in the presence of an initiator capable of generating free radicals under the reaction conditions. These polymers are formed by direct interaction between the precursor monomers in the presence of a free radical generator. The mole ratio of polyfluoroketone to ethylenically unsaturated moieties in the product depends upon the nature of the ethylenically unsaturated compound, particular catalyst used, and conditions employed in the copolymerization. This mole ratio can vary, however, from 1:1 to 1:1000.

Nonethylenic compounds such as carbon monoxide, sulfur dioxide, etc., as well as such ethylenic compounds as maleic anhydride, fumaronitrile, etc., which do not homopolymerize but which do copolymerize with ethylenic compounds may also be employed in the process.

In the formula of the ketone given above, X and X', which may be the same or different, are selected from the group consisting, individually, of hydrogen, halogen of atomic number 9 to 35, perfluoroalkyl, and ω-hydro-, ω-chloro-, ω-bromo-, and ω-alkoxyperfluoroalkyl, all of such alkyl groups being of up to 18 carbons, and jointly, of haloperfluoroalkylene of 1 to 3 carbons (all halogen being of atomic number 9 to 35). In the formula of usable ethylenic compounds, Z and Z' are hydrogen or halogen of atomic number 9 to 17, i.e., fluorine and chlorine, and Y and Y' are the same or different and are of the group consisting of hydrogen, halogen of atomic number 9 to 35, monovalent aromatic hydrocarbon of up to 7 carbons, alkyl of up to 18 carbon atoms, preferably of up to 7 carbon atoms, nitrile, oxycarbonylalkylenecarbonyloxyalkenyl (—O—CO—(CH$_2$—CH$_2$)$_n$—CO—O—CH=CH$_2$), carbonyloxyalkyleneoxycarbonylalkenyl (—CO—O—(CH$_2$—CH$_2$)$_n$—O—CO—CH=CH$_2$), where $n$ is 1 to 6, allyloxycarbonyl (H$_2$C=CH—CH$_2$—O—CO—)

carbacyl (RCO—), alkoxycarbonyl (ROCO—), alkoxy (RO—), carbacyloxy (RCOO—), where R is alkyl of up to 18 carbons, and carbonamido (—CONR'R''), where R' and R'' are hydrogen or alkyl of up to 7 carbons. Other usable ethylenic compounds include the cycloalkenes of up to 7 ring carbons as well as some other specific compounds. Preferred, however, are the compounds of the formula ZZ'C=CYY' where Z and Z' have the indicated meanings and Y and Y' are hydrogen or halogen of atomic number 9 to 17.

In a convenient method for accomplishing the process of this invention, a pressure reactor is charged with the desired polyfluoroketone or -ketones, a polymerization initiator, at least one ethylenically unsaturated compound and, optionally, a reaction medium and/or a suitable nonethylenic compound. The charged reactor is closed and maintained between 80° C. and 250° C. for up to 30 hours. Thereafter, the reactor is opened and the contents discharged. The resultant polymer is isolated by methods known to those skilled in the art.

Examples of specific polyfluoroketones useful in the above process are perfluoroacetone, 1H,3H-tetrafluoropropane-2-one, 1-chloropentafluoropropanone, perfluoropentane-2-one, 9-bromoperfluorononane-4-one, perfluorododecane-5-one, 1H,7H-dodecafluoroheptane-3-one, 1,5-dichloroperfluoropentane-3-one, 1,9-dibromoperfluorononane-5-one 1,17-dichloroperfluoroheptadecane-9-one, perfluorocyclobutanone, 3-chloro-2,2,3,4,4-pentafluorocyclobutanone, 3-bromo-2,2,3,4,4-pentafluorocyclobutanone, 4-methoxyperfluorobutane-2-one, 5-octyloxyperfluoropentane-3-one, and the like, and the hydrated forms thereof. These polyfluoroketones are known compounds preparable by general methods, as shown for example by Lovelace et al., "Aliphatic Fluorine Compounds," Reinhold Publishing Co., pages 182-187 (1958), and also in U.S. Patents 3,029,252, 3,039,995 and 3,091,643.

Specific usable ethylenically unsaturated compounds are ethylene, propylene, isobutylene, cyclohexene, cyclopentene, vinyl chloride, vinylidene chloride, vinyl fluoride, vinylidene fluoride, vinyl acetate, vinyl propionate, vinyl stearate, tetrafluoroethylene, 1-chloro-1,2,2-trifluoroethylene, acrylic and methacrylic acids, acrylic and methacrylic esters, e.g., methyl, ethyl, propyl and butyl acrylates and methacrylates, allyl acrylate and methacrylate, acrylamide and methacrylamide, N-alkyl and N,N-dialkyl acrylamides and methacrylamides, e.g., N-methyl and N,N-dimethyl acrylamide and methacrylamide, acrylonitrile, vinylidene cyanide, styrene, 1-methyl styrene, and the like. Other ethylenic compounds which can be used are ethylene glycol diacrylate and dimethylacrylate as well as the higher glycol and glycol ether esters of acrylic and methacrylic acids, divinyl succinate, 1-methylene- and 1-vinyl-2,2,3,3-tetrafluorocyclobutane, and the like.

As noted above, compounds which are not homopolymerizable but which copolymerize with ethylenic compounds can be introduced into the present polymers. These copolymerizable compounds include carbon monoxide, sulfur dioxide, maleic anhydride, fumaronitrile, and the like. When such nonhomopolymerizable compounds are used, the mole ratio of the ketonic moiety to the sum of the other moieties does not exceed the 1:1 mole ratio in the polymer itself. See Examples 17 and 26 below.

The polyfluoroketone and the ethylenic compound alone or ethylenic compound and other comonomer can be polymerized in a wide range of proportions, e.g., from 0.001 mole or less up to 1 mole of polyfluoroketone per mole of ethylenic compound alone or ethylenic compound plus other comonomer in the polymer. If desired, however, the polyfluoroketone can be used in excess, in which event it functions as a reactant and as a reaction medium.

In the process the polyfluoroketone can also enter into the product polymer by reaction with a carbon-hydrogen bond.

Any compound which generates free radicals under the conditions of reaction can be used as a polymerization initiator in the present reaction. Preferred types are peroxy compounds and azonitriles. Exemplary peroxy compounds are dibenzoyl peroxide, dilauroyl peroxide, dimethyl peroxide, diethyl peroxide, di-t-butyl peroxide, dioctadecyl peroxide, t-butyl peroxy pivalate, disuccinoyl peroxide, urea peroxide, peracetic and perbenzoic acids, alkyl di-alkylboron peroxides and alkali metal persulfates, perborates, and percarbonates, alone or in combination with a reducing agent. Exemplary azonitriles are 1,1'-azodicyclohexanecarbonitrile,
α,α'-azobis(α-cyclopropylpropionitrile),
α,α'-azobis(isobutyronitrile),
α,α'-azobis(α,γ-dimethylvaleronitrile),
α,α'-azobis(α-methyleneanthronitrile),
α,α'-azobis(α-phenylpropionitrile),
α,α'-azobis(α-cyclohexylpropionitrile),
α,α'-azobis(α-methyl-γ-carboxybutyronitrile),
disodium γ,γ'-azobis(γ-cyanovalerate),
1,1'-azodicamphanecarbonitrile, etc.

The amount of polymerization initiator employed depends upon the particular reactants being copolymerized, the temperature selected for operation, etc. As a rule, the amount is at least 0.001% by weight of the polyfluoroketone used. Generally, 0.01% by weight of the polyfluoroketone is adequate to promote the reaction at a satisfactory rate. A weight of initiator greater than 20% of the weight of the polyfluoroketone has no advantage and this percentage represents a practical, but noncritical, upper limit.

The polymerization can also be initiated using such other sources of free radicals as actinic light, combinations of actinic light with diketones, high energy radiation, benzoin plus actinic light, etc.

As noted, a reaction medium can be employed to bring about better contact between the reactants. Suitable reaction media include benzene, fluorocarbons, e.g., perfluorocyclobutane, dichlorotetrafluoroethane, dichlorodifluoromethane and 1,1,2-trichloro-1,2,2-trifluoroethane, perfluoro-2-butyltetrahydrofuran, bis(perfluoromethyl) benzyl alcohol, hexafluoroisopropanol, carbon bisulfide, octafluoro-1,4-dithiane, diphenyl, cyclohexane, diethyl ether, methanol, water, acetic acid, acetonitrile, tetrafluoropropyl acetate, bis(tetrafluoropropyl) carbonate, etc., or the fluoroketone itself. The choice of reaction medium will depend upon the particular polyfluoroketone and ethylenic compound being reacted.

If the amount of water or alcohol in the reaction medium is large with respect to the polyfluoroketone, then the amount of fluoroketone introduced into the polymer tends to decrease.

The reaction temperature and pressure can vary over wide limits. Thus, the temperature can be as low as −80° C. with very active free-radical generating initiators or as high as 250° C. with initiators requiring a high temperature for activation. As a rule, good reaction rates are obtained at temperatures in the range of 40° to 150° C., and this process is generally carried out within this temperature range.

The pressure employed depends upon the nature of the ethylenic compound, the temperature, and the initiator used. In the case of a normally gaseous ethylenic compound, it is customary to charge the reactor with the polyfluoroketone, reaction medium, if any, and initiator; thereafter inject the gaseous ethylenically unsaturated compound to a predetermined pressure at reaction temperature; and maintain the reaction conditions until the desired amount of gaseous ethylenic compound has been consumed. In the case of a normally liquid ethylenically unsaturated compound, an amount is usually added which is at least the molar equivalent of the polyfluoroketone.

The reactor is then closed and the charge heated under autogenous pressure. In the case of a normally solid ethylenically unsaturated compound, the latter may be added to the polyfluoroketone as such or as a solution or dispersion in a suitable inert reaction medium. The pressure used is suitably that which develops under the conditions of reaction, but increased pressures may be used.

The reaction is normally continued until there is no further pressure drop. Sometimes, however, it is desirable to add the ethylenically unsaturated compound incrementally and to continue the addition until there is no further pressure drop. This mode of operation is particularly useful with unstable or highly active reactants.

The material out of which the reactor is built is important only to the extent that it should be one resistant to corrosion, that it should not promote undesired side reactions, and that it should be mechanically safe under the conditions used. Stainless steels, silver-lined pressure reactors, glass, etc., are satisfactory and are usually employed.

The polymers produced in accord with this invention vary somewhat in structure, composition and properties, depending upon the nature and proportion of the particular olefinically unsaturated compound being copolymerized with the polyfluoroketone, catalyst, reaction medium and conditions employed in the polymerization. Thus, copolymers in which the comonomer is an olefinic hydrocarbon contain a preponderance of perfluoroisopropanol

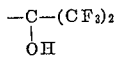

side chains. On the other hand, when the olefinically unsaturated compound is a fluorohydrocarbon or fluorocarbon, such as vinylidene fluoride or tetrafluoroethylene, the copolymers tend to have little or no perfluoroisopropanol side chains, i.e., such polymers contain the perfluoroketone component principally in the form of perfluoro ether groups

in the main polymer chain. Thus, the perfluoroketone appears as perfluoroether groups in the polymer backbone. The presence of water in the reaction medium favors formation of solid polymers with olefinic hydrocarbons. The presence of water in polymerizations in which fluorocarbons are employed as comonomers, however, tends to inhibit reaction with the fluoroketone, especially if water is present in large amounts. With olefinic hydrocarbons, the total absence of a reaction medium tends to favor formation of low copolymers which are in in the liquid to semisolid state.

The particular temperature employed in the polymerization is that which is required to activate the catalyst, and it would therefore vary with the particular compound being employed as a catalyst.

The polymers produced in accord with this invention vary from oils through semisolids to tough solids. Irrespective of the physical form, they are characterized by reduced flammability as compared to the polymers of the corresponding ethylenic compounds. These polymers are therefore useful in applications where reduced flammability is desirable. The polymers are also useful in imparting water repellency to fabrics (see Example 22), as metal protective coatings (see Example 28), as laminating adhesives and modifiers for other polymers to impart elasticity (see Example 19), as elastic foils (see Example 18), and for conversion to fibers and clear films having known utilities (see Examples 29 and 41).

EMBODIMENTS OF THE INVENTION

The examples which follow are submitted to illustrate and not to limit this invention. In these examples, percentages are by weight unless otherwise noted.

Example 1

A mixture of 3.6 g. of ethylene, 21 g. of hexafluoroacetone, and 5.3 g. of di-t-butyl peroxide was heated at 135° C. for seven hours in a stainless-steel pressure reactor. The pressure within the reactor was 690 lb./sq. in. initially, dropped to 145 lb./sq. in. in three hours, and rose 40 lbs./sq. in. during the next four hours. After removal of volatile material (B.P. up to 122° C./0.45 mm.; pot temperature to 210° C.) there remained a sticky grease which analyzed: C, 33.53%: H, 2.58%; F, 54.47%; mol. wt., 504. The (weight) ratio

—C(CF$_3$)$_2$O—/—CH$_2$CH$_2$— of this product is 1/2.44.

The polymer prepared above is useful as a lubricant.

Example 2

A 400-ml. stainless-steel pressure reactor was charged with 100 ml. of dry benzene, 1 g. of di-t-butyl peroxide, and 17 g. of hexafluoroacetone. The charge was heated to 135° C. and ethylene added to a pressure of 500 atmospheres. After a reaction period of 1¼ hours, the charge was allowed to cool to ambient temperature. A total pressure drop of 105 atmospheres occurred during the reaction period. The solid which formed was collected by filtration, washed with benzene, dried, and found to weigh 12 g. A sample was recrystallized from benzene and analyzed: F, 7.84%; inh. visc. was 0.48 at 125° C. as a 0.5% solution in α-chloronaphthalene. On the basis of fluorine analysis, the ratio —C(CF$_3$)$_2$O—/—CH$_2$CH$_2$— of this product is 1/46. Heat-treatment of the polymer up to 350° C. brought about a weight loss of 0.6%. Up to 400° F. the weight loss was only 1.5%.

The filtrate obtained from the removal of the solid product was evaporated to dryness to give 14.5 g. of a waxy solid. This solid was dissolved in methanol and reprecipitated by adding the solution to water. The product analyzed: F, 39.18%, corresponding to a

—C(CF$_3$)$_2$O—/—CH$_2$CH$_2$— ratio of 1/4.2.

Films of the above polymer can be deposited on metal substrates and such films function as protective coatings for metals.

Example 3

A 400-ml. stainless-steel pressure reactor was charged with 15.5 g. of hexafluoroacetone, 40 ml. of benzene, and 0.05 g. of di-t-butyl peroxide. The charge was heated to 131–134° C. and ethylene was added to a pressure of 500 atmospheres. During a six-hour reaction period there was an observed pressure drop of 382 atmospheres. The reaction mixture was allowed to cool to ambient temperature, the reactor opened and the contents discharged. The liquid product obtained was distilled and the colorless fraction boiling at 155–173° C./0.3 mm. (pot temperature was 210–233° C.) was collected. It weighed 4 g. and analyzed: F, 52.61%; mol. wt., 691. Infrared analysis indicated the presence of OH groups. The

—C(CF$_3$)$_2$O—/—CH$_2$CH$_2$— ratio is 1/1.85. The product obtained was soluble in aqueous sodium hydroxide and such solutions foam when stirred.

The residue remaining in the flask after the distillation was a paste (4.2 g.) which became a tough, sticky polymer on standing. It analyzed 53.72% F.

Example 4

A 400-ml. stainless-steel pressure reactor was charged with 1 g. of di-t-butyl peroxide, 17 g. (0.1 mole) of hexafluoroacetone, and 13 g. (0.3 mole) of propylene. The charge was heated at 135° C. for eight hours during which time there was an observed pressure drop of 130 lb./sq. in. The reaction mixture was allowed to cool to ambient temperature and the reactor was opened and discharged. After the removal of volatile products by heating to 125° C./0.2 mm., there resulted 4 g. of a water-white viscous oil. It was dissolved in a 1:6 benzene-pentane mixture, filtered, and cooled to —70° C. to precipitate the polymer. After drying at 56° C./0.3 mm., the polymer was analyzed and found to contain 46.24% F and to have a molecular weight of 572, which corresponds to a —C(CF$_3$)$_2$O—/—CH(CH$_3$)CH$_2$— ratio of 1/1.9.

Example 5

A mixture of 7.5 g. of hexafluoroacetone, 10 ml. (at —70° C.) of vinyl chloride, 20 ml. of benzene, and 20 mg. of α,α'-azobis(isobutyronitrile) was placed in a heat-resistant glass reactor in the absence of oxygen and water and sealed. The charge was heated at 60° C. for 24 hours. The resulting solid polymer was removed with benzene and found to weigh 4 g. Evaporation of the filtrate gave 3 g. of a second solid.

The first solid was dissolved in tetrahydrofuran and reprecipitated with methyl alcohol. Analysis showed that it contained 1.30% F.

The solid isolated from the filtrate was purified by dissolving it in benzene and reprecipitating it with methyl alcohol. Analysis showed it to contain 1.79% F.

Example 6

A mixture of 3.7 ml. of vinyl acetate, 4.3 ml. of hexafluoroacetone, and 30 mg. of benzoyl peroxide was placed in a heat-resistant glass tube, in the absence of oxygen and water, and sealed. After being heated at 80° C. for eight hours, the tube was opened and the unchanged hexafluoroacetone allowed to evaporate. The polymer was dissolved in ethyl alcohol-free chloroform, the solution filtered and the polymer recovered by precipitation with hexane. The polymer was dried at 100° C./0.1 mm. and found to contain 31.24% F, corresponding to a —C(CF$_3$)$_2$O—/—CH$_2$CH(Ac)— ratio of 1/2.4.

The above experiment was repeated at 60° C. with 1.3 mg. of α,α'-azobis(isobutyronitrile) as the initiator. After 23 hours the reaction was stopped. There resulted 3.5 g. of polymer which analysis showed contained 33.47% F. The inh. visc. of this polymer was 0.88 at 0.5% concentration in α-chloronaphthalene at 25° C.

Example 7

A mixture of 4.7 ml. of styrene, 4.3 ml. of hexafluoroacetone, and 30 mg. of benzoyl peroxide was placed in a heavy-walled heat-resistant glass tube, precautions being taken to exclude all moisture and oxygen. The tube was sealed and heated at 80° C. for eight hours. Thereafter the charge was allowed to cool to ambient temperature and the tube opened. There was recovered 3.7 ml. of hexafluoroacetone. The polymer which remained after removal of the hexafluoroacetone was dissolved in benzene, the resulting solution filtered, and the polymer reprecipitated with methyl alcohol. The polymer was dried at 100° C./0.1 mm. and found to contain 0.45% F.

Example 8

One hundred and thirty-five grams of vinyl fluoride was added to a mixture of 100 ml. of benzene, 0.1 g. of di-t-butyl peroxide, and 11 g. of hexafluoroacetone in a 400 ml. stainless-steel pressure vessel. The charge was heated at 135° C. and held at this temperature for 4½ hours. The initial pressure was 90 atmospheres but fell to 80 atmospheres over the 4½-hour reaction period. There resulted 10.1 g. of polymer. A portion was dissolved in tetrahydrofuran and, after filtration, reprecipitated with petroleum ether. It contained 43.32% F. (theory for polyvinyl fluoride is 41.4% F). The polymer thus contained 7% of combined hexafluoroacetone.

Example 9

A 400 ml. stainless-steel pressure reactor was charged with 100 ml. of benzene, 0.2 g. of di-t-butyl peroxide, and 40 g. of 1,3-dichloro-1,1,3,3-tetrafluoroacetone. The charge was heated to 135° C. and ethylene added to a pressure of 500 to 600 atmospheres. These conditions were maintained for 15 hours with an observed pressure drop of 55 atmospheres during the reaction period. Thereafter the charge was allowed to cool to ambient temperature and the contents of the reactor distilled by heating at 120° C./0.2 mm. There remained 13 g. of a sticky polymer, which was found to contain 24.07% Cl and 25.24% F. From these data the ratio F/Cl is found to be 2/1.02; the —C(CF$_2$Cl)$_2$O—/—CH$_2$CH$_2$— ratio is 1/3.6.

*Example 10*

A mixture of 5.2 g. (0.06 mole) of vinyl acetate, 6.8 g. (0.02 mole) of s-perfluoroheptanone, (CF$_3$CF$_2$CF$_2$)$_2$CO and 6.5 mg. (0.05 mole percent based on monomers used) of α,α'-azobis(isobutyronitrile) was placed in a heat-resistant glass tube, sealed in the absence of oxygen and moisture, and heated at 65° C. for 15 hours. The viscous reaction product was dissolved in chloroform, the resulting solution filtered and the polymer precipitated by addition of hexane. There resulted 6 g. of polymer containing 18.01% F, corresponding to a ketone content of 24.4%.

*Example 11*

Example 10 was repeated with 6.0 g. (0.07 mole) of vinyl acetate, 3.3 g. (0.01 mole) of ωH,ω'H-dodecafluoroheptane-3-one, H(CF$_2$)$_4$CO(CF$_2$)$_2$H, and 6.5 mg. (0.05 mole percent based on total monomers used) of α,α'-azobis(isobutyronitrile). There resulted 5.5 g. of polymer which analyzed 30.91% F. This value corresponds to a ketone content of 47.2%.

*Example 12*

Example 10 was repeated with 5.2 g. (0.06 mole) of vinyl acetate, 5.8 g. (0.02 mole) of 1,5-dimethoxyoctafluoropentane-3-one, (CH$_3$OCF$_2$CF$_2$)$_2$CO, and 6.5 mg. (0.05 mole percent based on total monomers used) of α,α'-azobis(isobutyronitrile). The resulting 4 g. of polymer contained 3.77% F corresponding to a fluoroketone content of 7.1%.

*Example 13*

Example 9 was repeated at 80° C. with a charge consisting of 100 ml. of cyclohexane, 0.1 g. of benzoyl peroxide, 12 g. of perfluorocyclobutanone, and ethylene at 500–600 atmospheres pressure. A pressure drop of 145 atmospheres ocurred during a reaction period of 10 hours. Thereafter the charge was allowed to cool to ambient temperature and the reactor discharged. The polymer which formed was suspended in benzene, the suspension filtered and the polymer obtained dried. The dried polymer weighed 15 g. A sample was purified by dissolution in hot benzene and cooling. The precipitated polymer was dried and found to contain 7.02% F, corresponding to a fluoroketone content of 11.5%.

*Example 14*

In a substantial repetition of the procedure of Example 3, a mixture of 50 ml. of water, 0.1 g. of di-t-butyl peroxide, and 19 g. of hexafluoroacetone was heated at 135° C. for 90 minutes under an initial pressure of 500–600 atmospheres of ethylene. A pressure drop of 90 atmospheres occurred during this period. There was obtained 20 g. of polymer containing 2.47% F, corresponding to a hexafluoroacetone content of 3.6%. A strong film was obtained by pressing the polymer at 2000 lb./sq. in. at 125° C. This film is useful as a wrapping foil.

*Example 15*

Example 14 was essentially repeated with a charge consisting of 17 ml. of water, 19 g. of hexafluoroacetone, 0.1 g. of di-t-butyl peroxide, and ethylene at 500 to 600 atmospheres pressure. There was obtained 17.5 g. of polymer which analyzed 3.63% F, a value which corresponds to 5.3% of hexafluoroacetone. A film pressed at 2000 lb./sq. in. and 125° C. was found to be strong and clearer than a film pressed under similar conditions from unmodified polyethylene. The film is useful as a wrapping foil.

*Example 16*

A mixture of 70 g. of hexafluoroacetone hydrate (CF$_3$COCF$_3$.1.5H$_2$O) and 0.15 g. of benzoyl peroxide was placed in a 400 ml. stainless-steel reactor, agitated and pressured to 600 atmospheres with ethylene at 60° C. There was an observed pressure drop of 30 atmospheres within a reaction period of three hours. The temperature was raised to 80° C. and held there for four hours. Under these conditions an additional pressure drop of 30 atmospheres was observed. Thereafter, the temperature was maintained at 80° C. for nine hours and a further pressure drop of 45 atmospheres was noted. Twenty grams of a tough, sticky polymer was obtained. This polymer was soluble in cold benzene and in diethyl ether. Cooling of the ether solution to −70° C. caused gelation, but upon warming to ambient temperature the gel disappeared.

A portion of the polymer obtained above was extracted six times with petroleum ether, one day being allowed for each extraction. The insoluble material was dried at 100° C. under 0.2 mm. pressure and analyzed. The product was found to contain 27.38% fluorine, corresponding to 40% of hexafluoroacetone in the polymer. The inherent viscosity of the product as a 0.1% solution in tetrahydronaphthalene at 125° C. was 0.45. Infrared analysis showed the presence of strong C—F absorption in the 7.8–9μ region.

Evidence that the product obtained as above is not a polyethylene having hexafluoroacetone grafted thereon is found in the following experiment:

A mixture of 20.3 g. of a branched chain polyethylene, 190 cc. of benzene, and 31 g. of hexafluoroacetone was heated at 135° C. with agitation. Ten cc. of benzene containing 0.4 g. of di-t-butyl peroxide was then added. After two hours, the mixture was cooled and the polymer collected by filtration. After redissolution in hot benzene and precipitation by cooling, the polymer was dried and found to contain 40% by weight of combined hexafluoroacetone, as determined by fluorine analysis.

In contrast to the product obtained by polymerizing ethylene with hexafluoroacetone, the product obtained by modifying preformed polymer with hexafluoroacetone was insoluble in cold benzene and a film obtained therefrom was clear, pliable and nontacky. The product obtained by the copolymerization of ethylene with hexafluoroacetone was elastomeric and sticky. In fact, when the film was brought into contact with another similar film, it adhered tenaciously thereto.

A mixture of the polymer obtained by copolymerizing ethylene with hexafluoroacetone and polymethyl methacrylate, when pressed, gave a transparent film which could be creased slowly without cracking, whereas unmodified polymethyl methacrylate cracked under the same conditions.

*Example 17*

A mixture of 50 ml. of benzene, 0.1 g. of di-t-butyl peroxide and 17 g. of hexafluoroacetone was heated at 135° C. in a 400 ml. reactor for 11 hours under an initial pressure of 500–600 atmospheres of a 1:1 ethylene/carbon monoxide gas mixture. A pressure drop of 105 atmospheres was observed during this reaction period. The product consisted of a mobile liquid and a yellow grease. When the yellow grease was dried at 100° C. under 0.2 mm. pressure, there resulted a weak, rubbery polymer. A film of this polymer showed strong carbonyl absorption in the infrared at 5.65μ, strong carbon-fluorine absorption at 7–10μ, and strong OH absorption at 2.95μ. It contained 33.14% fluorine.

Example 18

Twenty ml. of hexafluoroacetone was added to a 100 ml. quartz flask equipped with a condenser connected to a trap cooled with solid carbon dioxide. The system was flushed with nitrogen, the flask was cooled with solid carbon dioxide, and tetrafluoroethylene monomer was added through a silica-gel trap at atmospheric pressure and around −78° C. After 15 minutes' exposure to ultraviolet light (Hanovia, type 30600; 4 inches distant from the quartz flask), a white flocculent precipitate formed. The exposure to ultraviolet light was continued at atmospheric pressure for 6 hours during which time the flocculent precipitate formed into a film on the surface of the hexafluoroacetone solution.

The hexafluoroacetone and residual tetrafluoroethylene were distilled from the white-to-translucent film and the film washed well with water to remove any possible hydrate contamination. The film initially stretched like an elastomer and demonstrated snap-back characteristics. After being heated for 2 hours at 125° C. in vacuo, the film had lost most of its snap-back characteristics and was more like a plastic.

The heat-treated film was pressed at 180° C. for 1 minute. Examination in the infrared showed bands at 10.0–10.1μ, 10.45–10.52μ, and 11.13–11.21μ, bands which are not characteristic of tetrafluoroethylene homopolymer. By elemental analysis the film was shown to contain 23.1% C.

Example 19

Twenty ml. of hexafluoroacetone was introduced at −78° C. into a dry 100 ml. quartz flask equipped with a sidearm gas-inlet tube, a solid carbon dioxide cooled condenser, topped with a solid carbon dioxide cooled trap, and a drying tube. The hexafluoroacetone was irradiated with ultraviolet light and approximately 20 ml. of tetrafluoroethylene monomer, purified by passage through a silica gel tube, was added at atmospheric pressure. One hour after the start of irradiation, polymer had formed in the liquid. The system was swept with nitrogen to remove tetrafluoroethylene monomer from the solution and irradiation was maintained for three more hours, polymer continuing to form. The temperature of the mixture ranged from around −40 to −78° C. Throughout the irradiation atmospheric pressure was maintained.

Residual hexafluoroacetone was distilled off and the white rubbery polymer which formed was removed from the flask and heated in vacuo at 125° C. for 3 days. The infrared spectrum of this polymer (between salt plates) was similar to that of the product of Example 18. High absorbance was shown in the 7.0–9.4μ region, with absorbance at about 10.1, 10.5, and 11.1μ. After 5 days in vacuo at 125° C. the infrared spectrum exhibited absorbances at 10.1–10.5 and 11.1μ, differentiating the hexafluoroacetone-tetrafluoroethylene polymer from tetrafluoroethylene homopolymer.

Following 5 days' heating, the hexafluoroacetone-tetrafluoroethylene polymer was extracted with hexafluoropropylene dimer. Infrared analysis of the extracted polymer showed characteristic absorbances in the 10.1, 10.5 and 11.1μ regions. Upon evaporation of the dimer, a trace of a non-homogeneous material resembling a mixture of an oil and a wax was recovered. The infrared spectrum of this material showed it to be a fluorocarbon.

After an additional heating at 125° C. in vacuo, the extracted hexafluoroacetone-tetrafluoroethylene polymer was subjected to differential thermal analysis. This analysis showed a crystalline transition at 18° C. and an exothermic reaction occurred from 125° C. to 310° C., peaking at 232° C. and 297° C. Partial melting occurred at 327° C. An exothermic reaction occurred above 360° C. with evolution of a gas.

Example 20

Another run was made in the apparatus and in the manner of Example 19. Ten ml. of hexafluoroacetone was charged into the 100 ml. quartz flask maintained at around −40° C. and irradiated with ultraviolet light. Tetrafluoroethylene gas at atmospheric pressure was wafted over the surface of the hexafluoroacetone for 2 hours with vigorous stirring. Addition of tetrafluoroethylene was then discontinued for 1 hour and subsequently renewed for 4 hours. There was obtained 0.9 g. of polymer. The polymer was heated for 3 days at 125° C. and pressed into a film which showed the same infrared spectrum as the polymers of Examples 18 and 19.

Example 21

In another run made in the equipment of Example 19, 10 ml. of hexafluoroacetone was subjected to irradiation with ultraviolet light at reflux temperature, and tetrafluoroethylene gas fed into the irradiated hexafluoroacetone at near atmospheric pressure for 1 hour with stirring. A white solid product was isolated and pressed at room temperature into a thin, self-supporting film.

The thin film obtained as above was heated for 3 hours at 200° C. and for an additional 1 hour at 232° C., all under 2 m. pressure. No off-gases were isolated or detected by infrared analysis. The infrared spectrum of the heated polymer (in the form of a translucent to transparent film) showed absorptions at 10.1, 10.5, and 11.1μ, characteristic of the polymers of Examples 18, 19, and 20.

Example 22

The equipment was the same as that used in Example 19. In the dry 100 ml. quartz flask was placed a 1½ inch piece of cotton duck cloth previously washed in boiling water and dried at temperatures up to 150° C. Hexafluoroacetone sufficient to moisten the cloth was introduced into the flask at −78° C. The flask was exposed to ultraviolet light and tetrafluoroethylene monomer run thereinto until it was seen to be adsorbed on the surface of the fabric. The cloth, impregnated with hexafluoroacetone and tetrafluoroethylene, was subjected to irradiation with ultraviolet light for 2 hours. The exposure was stopped when it was seen that polymer build-up was occurring at the edges of the cloth.

The cloth was then heated to 100° C. under nitrogen and removed from the flask. Except at certain points along the edges of the cloth there was no visual evidence of polymer formation. The cloth was flexed and rubbed against itself vigorously with no evidence of surface erosion. The feel of the cloth was much as it had been prior to treatment.

The cloth was laid out on a flat surface at about 23° C. and a relative humidity of about 40% and drops of water were placed thereon. When the surface was tilted, the drops ran off. When the surface remained flat, the drops evaporated without penetrating the cloth.

Example 23

Example 22 was repeated with a 1¼" x 3" strip of heat-cleaned glass fabric in place of the cotton duck. After the treatment, drops of water rolled off the surface of the fabric.

Example 24

To 5.5 g. glass fibers ⅟₃₂" in length (Owens Corning No. 709, no binder), placed in a dry 100 ml. quartz flask, was added 3 ml. of hexafluoroacetone at −78° C. Tetrafluoroethylene monomer was then fed into the reaction mixture at approximately atmospheric pressure for 100 minutes with exposure to ultraviolet light. The contents of the flask were stirred during the irradiation. After drying, the glass fibers were found to be coated with 0.2 g. of polymer.

Example 25

In the 100 ml. quartz flask of Example 19 there was placed a section of heat-cleaned glass fabric weighing 0.45 g. and 2 ml. of hexafluoroacetone were added at −78° C. Tetrafluoroethylene monomer at near atmospheric pressure was then added and the flask exposed to ultraviolet light for 2.5 hours, the temperature varying from −78° C. to approximately −33° C. during the exposure. The glass fabric monopoly was heated and found to contain 42.5 wt. percent of polymer. The monopoly was pressed at 350° C. and 1000 p.s.i. for 2 minutes to yield a structure impermeable to water.

*Example 26*

A mixture consisting of 28 g. of butene-2, 41 g. of sulfur dioxide, 33 g. of hexafluoroacetone, and 1 ml. of ethyl alcohol saturated with silver nitrate was shaken in a silver-lined reactor at 34–8° C. for 20 hours. The white solid polymer which formed was washed with water and dried. Its weight was 45 g. The solid terpolymer of butene-2, sulfur dioxide, and hexafluoroacetone thus obtained was found to contain 2.11% F, corresponding to 3.1% of combined hexafluoroacetone.

*Example 27*

A mixture of 250 g. of octafluorodithiane and 0.3 g. of di-t-butyl peroxide was placed in a stainless-steel pressure vessel capable of withstanding 10,000 p.s.i.g. internal pressure. Then 110 g. of hexafluoroacetone and 110 g. of vinylidene fluoride were added to the cooled vessel in that order. The sealed vessel was heated at 116–135° C. over a period of 12 hours. The vessel was then cooled and the unreacted gaseous materials vented. The solution obtained was diluted with sufficient alcohol to completely precipitate the polymer. The collected polymer was washed with further alcohol and dried, giving 89 g. of white polymer product.

The polymer obtained as above was readily soluble in methyl ethyl ketone. Evaporation of the solution obtained gave a rubbery soft film. The nuclear magnetic resonance spectrum indicated that the product contained 22% by weight of —C(CF$_3$)$_2$O— units and 78% by weight of —CF$_2$CH$_2$— units. The ratio —C(CF$_3$)$_2$O—/—CF$_2$CH$_2$— was 1/3.55. The infrared spectrum of the polymer was consistent with the —C(CF$_3$)$_2$O— structure. The inherent viscosity of a 0.5% by weight solution of the polymer in dimethylformamide at 25° C. was 0.61.

*Example 28*

Example 27 was repeated using 383 g. of 1,1,2-trichloro-1,2,2-trifluoroethane, 0.3 g. of di-t-butyl peroxide, 55 g. of hexafluoroacetone and 155 g. of vinylidene fluoride (ratio (CF$_3$)$_2$CO/CF$_2$CH$_2$ was 1:2.82). The reaction mixture was heated at 110–135° C. for 12 hours. Isolation of the product in the manner of Example 27 gave 112 g. of white polymer.

The polymer formed a clear coating on aluminum by melt fusing at 300° C. The polymer (9 g.) was soluble in hot methyl ethyl ketone (75 g.).

The nuclear magnetic resonance spectrum indicated that the polymer contained 13% by weight of —C(CF$_3$)$_2$O— units and 87% by weight of —CF$_2$CH$_2$— units (the ratio —C(CF$_3$)$_2$O—/—CF$_2$CH$_2$ is 1/6.6). The inherent viscosity of a 0.5% by weight solution of the polymer in dimethylformamide was 0.54.

*Example 29*

Example 27 was repeated using 105 g. of acetic acid, 192 g. of 1,1,2-trichloro-1,2,2-trifluoroethane, 0.4 g. of dilauroyl peroxide, 38 g. of hexafluoroacetone, 38 g. of tetrafluoroethylene and 150 g. of vinylidene fluoride (ratio CF$_2$=CH$_2$/CF$_2$=CF$_2$: 3.95/1; ratio (CF$_2$=CH$_2$+CF$_2$=CF$_2$)/(CF$_3$)$_2$C=O 4.95/1). The reaction mixture was heated at 60–85° C. for 12 hours; the reaction pressure decreased from 3,000 p.s.i.g. to 175 p.s.i.g. The product was isolated as in Example 27, giving 185 g. of polymer.

The polymer obtained as above was drawn into a fiber at 160° C. and melt pressed into a clear film at 175° C. Evaporation of a methyl ethyl ketone solution gave a film of fair hardness and good clarity which cold draws nicely but does not easily tear.

Analysis by nuclear magnetic resonance indicated that the polymer contained 71% by weight of —CF$_2$CH$_2$— units, 24% of —CF$_2$CF$_2$— units and 5% of

—C(CF$_3$)$_2$—O— units and 5% —C(CF$_3$)$_2$—O— units. This analysis corresponds to a weight ratio —CF$_2$CH$_2$—/—CF$_2$CF$_2$— of 2.95/1 and a weight ratio

—C(CF$_3$)$_2$O—/(CF$_2$CH$_2$—+—CF$_2$CF$_2$—)

of 1/6.7. The inherent viscosity of a 0.5% by weight solution of the polymer in dimethylformamide was 0.61 at 25° C.

*Example 30*

Example 27 was repeated with 345 g. of 1,1,2-trichloro-1,2,2-trifluoroethane, 0.5 g. of dilauroyl peroxide, 125 g. of hexafluoroacetone, 50 g. of vinylidene fluoride and 50 g. of tetrafluoroethylene (weight ratios,

CF$_2$=CH$_2$/CF$_2$=CF$_2$:

1/1; (CF$_2$=CH$_2$+CF$_2$=CF$_2$)/(CF$_3$)$_2$C=O: 0.80/1). The reaction mixture was heated at 66–85° C. for 10 hours; the pressure decreased from 4,000 p.s.i.g. to 200 p.s.i.g. The product was isolated as in Example 27 giving 110 g. of polymer. Analysis by nuclear magnetic resonance indicated that the polymer contained 40% by weight of —CF$_2$CH$_2$— units, 47% of —CF$_2$CF$_2$— units and 13% of —C(CF$_3$)$_2$O— units. The weight ratios are: —CF$_2$CH$_2$—/—CF$_2$CF$_2$—: 0.85/1; and

—C(CF$_3$)$_2$O—/(CF$_3$CH$_2$—+—CF$_2$CF$_2$—):

1/6.71).

*Example 31*

Example 27 was repeated using 307 g. of 1,1,2-trichloro-1,2,2-trifluoroethane, 0.5 g. of dilauroyl peroxide, 125 g. of hexafluoroacetone, 25 g. of tetrafluoroethylene and 100 g. of vinylidene fluoride (weight ratios,

CF$_2$=CH$_2$/CF$_2$=CF$_2$:

4/1; (CF$_2$=CF$_2$+CF$_2$=CF$_2$)/CF$_3$)$_2$C=O: 1/1). The reaction mixture was heated at 60–90° C. for 12 hours; the pressure decreased from 2100 p.s.i.g. to 375 p.s.i.g. The product was isolated as in Example 27 giving 111 g. of polymer.

Evaporation of a methyl ethyl ketone solution of the polymer gave a slightly rubbery film. Analysis of the polymer by nuclear magnetic resonance indicated that the polymer contained 61% by weight of —CF$_2$CH$_2$— units, 27% of —CF$_2$CF$_2$— units, and 12% of —C(CF$_3$)$_2$O— units (weight ratios, —CF$_2$CH$_2$—/CF$_2$CF$_2$—: 2.26/1;

—C(CF$_3$)$_2$O—/(—CF$_2$CH$_2$—+—CF$_2$F$_2$—):

1/7.3).

*Example 32*

Example 27 was repeated using 307 g. of 1,1,2-trichloro-1,2,2-trifluoroethane, 0.5 g. dilauroyl peroxide, 125 g. of hexafluoroacetone, 45 g. of tetrafluoroethylene and 90 g. of vinylidene fluoride (weight ratios,

CF$_2$=CH$_2$/CF$_2$=CF$_2$:

2/1; (CF$_3$)$_2$CO/(CF$_2$=CH$_2$+CF$_2$=CF$_2$): 1/1.08). The reaction mixture was heated at 62–86° C. for 12 hours. The product was isolated as in Example 27 giving 139 g. of polymer. The polymer formed a clear film on evaporation of a methyl ethyl ketone solution thereof. Analysis by nuclear magnetic resonance indicated that the polymer contained 55% by weight of —CF$_2$CH$_2$— units, 29% of —$CF_2CF_2$— units, and 16% of —$C(CF_3)_2O$— units (weight ratios, —$CF_2CH_2$—/$CF_2CF_2$: 1.9/1;

—$C(CF_3)_2O$—/(—$CF_2CH_2$—+—$CF_2CF_2$—): 1/5.2).

*Example 33*

Example 27 was repeated using 276 g. of 1,1,2-trichloro-1,2,2-trifluoroethane, 0.5 g. of dilauroyl peroxide, 125 g. of hexafluoroacetone, 60 g. of tetrafluoroethylene and 90 g. of vinylidene fluoride (weight ratios, $CF_2=CH_2/CF_2=CF_2$:

1.5/1; $(CF_3)_2CO/(CF_2=CH_2+CF_2=CF_2)$: 1/1.21). The reaction mixture was heated at 60–80° C. for 14 hours; the pressure decreased from 1,000 p.s.i.g. to 225 p.s.i.g. The product was isolated as in Example 27 giving 162 g. of polymer. A film of the polymer, cast from a solution of the polymer in methyl ethyl ketone, was soft and rubbery, having excellent "yielding" tear strength. Analysis of the polymer by nuclear magnetic resonance indicated that the polymer contained 50% by weight of —$CF_2CH_2$— groups, 37% of —$CF_2CF_2$— groups and 13% of —$(C(CF_3)_2O$—groups (weight ratios,

—$CF_2CH_2$—/$CF_2CF_2$—:

1.35/1; —$C(CF_3)_2O$—/(—$CF_2CH_2$—+$CF_2CF_2$—): 1/6.7).

*Example 34*

Example 27 was rejeated using 307 g. of 1,1,2-trichloro-1,2,2-trifluoroethane, 0.5 g. of dilauroyl peroxide, 125 g. of hexafluoroacetone, 75 g. of tetrafluoroethane and 50 g. of vinylidene fluoride (weight ratios, $CF_2=CH_2/CF_2=CF_2$:

0.67/1; $CF_2=CF_2/(CF_3)_2C=O$: 1/1). The reaction mixture was heated at 60° C. and the product isolated as in Example 27 giving 88 g. of polymer. A film of the polymer cast by evaporation of a dimethylacetamide solution at 120° C. was rather hard and tough. Analysis of the polymer by nuclear magnetic resonance indicated that the polymer contained 40% by weight of —$CF_2CH_2$— groups, 56% of —$CF_2CF_2$— groups and 4% of —$C(CF_3)_2O$— groups (weight ratios,

—$CF_2CH_2$—/—$CF_2CF_2$—:

0.71/1; —$C(CF_3)_2O$—/(—$CF_2CH_2$—+—$CF_2CF_2$—): 1/24).

*Example 35*

Example 27 was repeated using 52 g. of acetic acid, 230 g. of 1,1,2-trichloro-1,2,2-trifluoroethane, 0.4 g. of dilauroyl peroxide, 150 g. of hexafluoroacetone, 40 g. of tetrafluoroethylene and 80 g. of vinylidene fluoride (weight ratios, $CF_2=CH_2/CF_2=CF_2$;

$(CF_2=CH_2+CF_2=CF_2)/(CF_3)_2C=O$:

2:1; 0.81/1). The mixture was heated at 58–90° C. for 12 hours; the reaction pressure decreased from 650 p.s.i.g. to 225 p.s.i.g. The product was isolated as in Example 27 giving 89 g. of polymer. Analysis of the polymer by nuclear magnetic resonance indicated that the polymer contained 51% by weight of —$CF_2CH_2$— units, 35% of —$CF_2CF_2$— units, and 14% of —$C(CF_3)_2O$— units (weight ratios —$CF_2CH_2$—/—$CF_2CF_2$—: 1.4/1;

—$C(CF_3)_2O$—/(—$CF_2CH_2$—+$CF_2CF_2$—): 1/6.1).

*Example 36*

Example 27 was repeated using 199 g. of 1,1,2-trichloro-1,2,2-trifluoroethane, 59 g. of acetonitrile, 0.5 g. of dilauroyl peroxide, 125 g. of hexafluoroacetone, 45 g. of tetrafluoroethylene and 90 g. of vinylidene fluoride (weight ratios, $CF_2=CH_2/CF_2=CF_2$: 2/1;

$(CF_2=CH_2+CF_2=CF_2)/(CF_3)_2C=O$:

1.08/1). The reaction mixture was heated at 60–80° C. for 12 hours; the pressure decreased from 3,900 p.s.i.g. to 1175 p.s.i.g. The product was isolated as in Example 27 giving 83 g. of polymer. Analysis by nuclear magnetic resonance indicated that the polymer contained 60% by weight of —$CF_2CH_2$— units, 33% of —$CF_2CF_2$— units, and 7% of —$(C(CF_3)_2O$— units (weight ratios, —$CF_2CH_2$—/—$CF_2CF_2$—: 1.81/1;

—$C(CF_3)_2O$—/(—$CF_2CH_2$—+—$CF_2CF_2$—): 1/13.2).

*Example 37*

Example 27 was repeated using 345 g. of 1,1,2-trichloro-1,2,2-trifluoroethane, 0.5 g. of dilauroyl peroxide, 125 g. of hexafluoroacetone, 20 g. of chlorotrifluoroethylene and 80 g. of vinylidene fluoride (weight ratios, $CF_2=CH_2/CF_2=CFCl$: 3.98/1;

$(CF_2=CH_2+CF_2=CFCl)/(CF_3)_2C=O$:

0.80). The mixture was heated at 60–80° C. for 12 hours; the reaction pressure decreased from 1075 p.s.i.g. to 400 p.s.i.g. The product was isolated as in Example 27 giving 58 g. of polymer. The polymer was tacky and adhered well to aluminum metal, even after immersion in boiling water for one hour. The polymer is useful as a contact adhesive for bonding polymers to metals.

*Example 38*

Example 27 was repeated using 383 g. of 1,1,2-trichloro-1,2,2-trifluoroethane, 0.3 g. of dilauroyl peroxide, 100 g. of hexafluoroacetone, 10 g. of chlorotrifluoroethylene, 30 g. of tetrafluoroethylene and 80 g. of vinylidene fluoride (weight ratios, $CF_2=CH_2/(CH_2=CFCl+CF_2=CF_2)$:

2/1; $(CF_2=CH_2+CF_2=CF_2+CF_2CFCl/(CF_3)_2C=O$: 1.20/1). The reaction mixture was heated at 63–75° C. for 12 hours; the reaction pressure decreased from 440 p.s.i.g. to 325 p.s.i.g. The product was isolated as in Example 27 giving 67 g. of rubbery crumb polymer. Evaporation of a methyl ethyl ketone solution of the polymer gave a clear, slightly tacky film of excellent tear strength. Analysis indicated that the polymer contained 2.4% chlorine, hence 7.8% by weight of —$CF_2CFCl$— units.

*Example 39*

A Hastelloy C® reactor of 145 ml. capacity was charged with 10 ml. of bis(1H,1H,3H-perfluoropropyl)carbonate, $(HCF_2CF_2CH_2O)_2CO$, 0.1 g. of di-t-butyl peroxide, 87 g. of hexafluoroacetone, and 5.3 g. of tetrafluoroethylene, and the charge maintained at 135° C. for eight hours. During this time the pressure within the reactor dropped from 565 atm. to 538 atm. There resulted 1.5 g. of a light brown polymer. The polymer was extracted in a Soxhlet extractor with toluene for two days then dried at 125° C./0.2 mm. The infrared spectrum as a KBr pellet had bands at 10.35μ and 10.28μ, which are not found in polytetrafluoroethylene. An X-ray pattern disclosed that the interchain distance was 0.3% greater than that which characterizes polytetrafluoroethylene. This is ascribable to the $CF_3$ groups pendent from the polymer chain. The polymer analyzed 71.47% F. Theory for $(—CF_2CF_2—)_n$ is 76% F. and for $CF_3COCF_3$, 67.7% F.

*Example 40*

Following the procedure of Example 39, the reactor was charged with 87 g. (0.525 mole) of hexafluoroacetone, 5.3 g. of tetrafluoroethylene, 0.2 g. of benzoyl peroxide, and 4.7 g. (0.26 mole) of water. The charge was heated for three hours at 60° C., three hours at 70° C., three hours at 80° C. and three hours at 90° C. There resulted 3 g. of polymer which was extracted with hot toluene for two days in a Soxhlet extractor. The polymer had lines at 10.3μ and 10.45μ in its infrared spectrum. Its X-ray pattern showed that the interchain distance was 3.5% greater than in polytetrafluoroethylene. The polymer analyzed 71.43% F.

*Example 41*

(A) A Hastelloy C® reactor of 240 ml. capacity was charged with 6.2 g. (0.2 mole) of methanol and 0.15 g. of a 75% solution of t-butyl peroxy pivalate in mineral spirits and cooled in a solid carbon dioxide/acetone bath. The reactor was evacuated and 33 g. (0.2 mole) of hexafluoroacetone was added. The reactor was brought to room temperature, placed into position, and brought to 265 p.s.i. with vinyl fluoride at 23° C. The reactor was shaken and heated at 45° C. for 2½ hours, 50° C. for three hours, and finally at 55° C. for 1½ hours. The contents were heated with water and dried. There resulted 20 g. of white solid. Analysis of a hot toluene washed sample: C, 48.13%; H, 5.67%; F, 43.71%; inh. visc. 0.49 at 0.5% concentration in dimethylformamide at 25° C. The analysis is equivalent to 9% of combined hexafluoroacetone.

(B) A sample of polymer, prepared as above, was pressed at 200° C. to a strong, transparent, colorless orientable film, useful as a wrapping foil and other applications in which films are known to be useful. The infrared spectrum of the film had an —OH band at 2.85μ. This film also was dyed blue when immersed in an aqueous solution of Du Pont Sevron Blue 2G®. The thus colored film is useful as a decorative wrapping. The polymer was soluble in hot butyrolactone, dimethyl sulfoxide, and in cold and hot dimethylformamide. Thin, transparent films can be cast from the dimethylformamide solutions. In contrast, polyvinyl fluoride is insoluble in the mentioned solvents, is not dyed by Du Pont Sevron 2G®, and is almost impossible to press without decomposition.

(C) Polymer, prepared as above, was blended with polymethyl methacrylate and the composite pressed to a film which was cut in small pieces and remolded. This was repeated ten times to give a homogeneous flexible tough film which could be creased without any signs of cracks. This film is useful as a wrapping foil. A film of polymethyl methacrylate alone cracks when bent. The difference in results demonstrates the two polymers are compatible. In contrast, polyvinyl fluoride is incompatible with polymethyl methacrylate.

*Example 42*

A Hastelloy C® reactor of 240 ml. capacity was charged with 9.4 g. (0.3 mole) of methanol, 50 g. (0.3 mole) of hexafluoroacetone, 0.1 g. of benzoyl peroxide, 5 g. of ethylene, and 20 g. of tetrafluoroethylene. During an eight-hour reaction time at 80° C., the pressure dropped from 760 p.s.i. to 325 p.s.i. The resulting polymer was boiled with water for one hour and dried. It weighed 15 g. A film pressed at 260° C. and 8,000 p.s.i. was tough and transparent and adhered so tenaciously to aluminum that it could not be stripped away. It is therefore useful as a protective coating for the aluminum. The infrared spectrum of the film had a fairly strong —OH band at 2.75μ. The polymer gave a gel with hot dimethylformamide. In contrast, tetrafluoroethylene/ethylene copolymers are less tractable and are hazy.

*Example 43*

Ninety-six grams of hexafluoroacetone-1.5 hydrate and 0.2 gram of benzoyl peroxide were placed in a 250 cc. flask fitted with a paddle stirrer, thermometer, reflux condenser, nitrogen inlet, and dropping funnel. The flask was heated to an internal temperature of 80° C. with a water bath, and 30 g. of freshly distilled methyl methacrylate was added drop by drop over a 1.5 hour period. The temperature was held at 81° C. for another 2 hours, and the resulting viscous, almost colorless syrup was poured into an excess of water. The precipitated polymer was washed several times with water, air-dried, dissolved in acetone, reprecipitated in water in a blender, the water boiled off for 15 minutes, soaked in water for 16 hours, and then vacuum-oven dried at 110° C. for 6 hours. Twenty-eight grams of white polymer was obtained. Tough, colorless films, useful as wrapping foils, were readily obtained by pressing between aluminum foil at 160–220° C. for 2 minutes at 2000–18,000 p.s.i. gauge pressure. Analyses of films pressed at 220° C. were similar to those of the oven-dried powder and were 2.93, 3.10% F, or 4.4% incorporated hexafluoroacetone.

New infrared absorption peaks not found in 100% polymethyl methacrylate were observed at 8.25μ and at 14.1μ, indicating the presence of C—F bonds, and broad enhanched absorption was also obtained at 3.0–3.2μ, indicating the presence of the associated perfluoroisopropaol group,

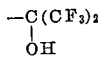

present in addition to ether oxygen in the polymer chain. Inherent viscosity of the polymer was 0.28 in acetone (0.25%, 25° C.). The 264 p.s.i. heat distortion temperature of a bar pressed at 220° C. was 114° C. Comparable data on a commercial polymethyl methacrylate (high-softening grade, Lucite® 40 acrylic resin) are inherent viscosity 0.40 in acetone and heat distortion temperature 94° C. Another commercial Lucite® of inherent viscosity 0.25 in acetone (Lucite® 129) had a heat distortion temperature of 83° C.

These data show that copolymerization with hexafluoroacetone provides a new approach toward polymers high in methyl methacrylate content having high heat distortion temperatures.

Since obvious modifications and equivalents in the invention will be evident to those skilled in the chemical arts, I propose to be bound solely by the appended claims.

The embodiments of the invention in which an exclusive property or privilege is claimed are defined as follows:

1. An addition copolymer of
(A) at least one polyfluoroketone of the formula

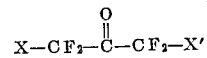

wherein X and X' are selected from the group consisting (1), individually, of hydrogen, fluorine, chlorine and bromine, and perfluoroalkyl, ω-hydro-, ω-chloro-, ω-bromo-, and ω-alkoxyperfluoroalkyl of up to 18 carbons and (2), jointly, of haloperfluoroalkylene of 1–3 carbons; and
(B) at least one ethylenically unsaturated compound of the group consisting of cycloalkenes of up to 7 ring carbon and alkenes of the formula ZZ'C=CYY' wherein:
Z and Z' are the same or different and are selected from the group consisting of hydrogen and halogen of atomic number 9 to 35; and
Y and Y' are the same or different and are selected from the group consisting of: hydrogen; halogen of atomic number 9 to 35; monovalent aromatic hydrocarbon of up to 7 carbons; alkyl of up to 18 carbons; nitrile;

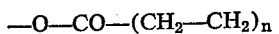 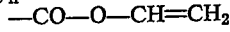

and

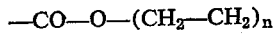 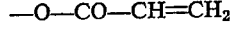

where n is 1 to 6; allyloxycarbonyl; RCO—, ROCO—, RO— and RCOO—, where R is alkyl of up to 18 carbons; and —CON'R", where R' and R" are hydrogen or alkyl of up to 7 carbons; said addition copolymers varying from oils through semisolids to elastomers and tough solids, containing a plurality of discrete recurring moieties of each monomer present, and having a mole ratio of total polyfluoroketone to total alkene in the range 1:1 to 1:1000.

2. An addition copolymer of claim 1 containing additionally moieties derived from a member of the group consisting of carbon monoxide, sulfur dioxide, maleic anhydride and fumaronitrile.

3. An addition copolymer of claim 1 wherein the polyfluoroketone is hexafluoroacetone.

4. An addition copolymer of claim 1 wherein the ethylenically unsaturated compound is ethylene.

5. An addition copolymer of claim 1 wherein the ethylenically unsaturated compound is propylene.

6. An addition copolymer of claim 1 wherein the ethylenically unsaturated compound is a vinylidene compound.

7. An addition copolymer of claim 1 wherein the polyfluoroketone is hexafluoroacetone and the ethylenically unsaturated compound is ethylene.

8. An addition copolymer of claim 1 wherein the polyfluoroketone is hexafluoroacetone and the ethylenically unsaturated compound is propylene.

9. An addition copolymer of claim 1 wherein the polyfluoroketone is hexafluoroacetone and the ethylenically unsaturated compound is vinyl acetate.

10. An addition copolymer of claim 1 wherein the polyfluoroketone is hexafluoroacetone and the ethylenically unsaturated compound is vinyl chloride.

11. An addition copolymer of claim 1 wherein the polyfluoroketone is hexafluoroacetone and the ethylenically unsaturated compound is vinyl fluoride.

12. An addition copolymer of claim 1 wherein the polyfluoroketone is hexafluoroacetone and the ethylenically unsaturated compound is vinylidene fluoride.

13. An addition copolymer of claim 1 wherein the polyfluoroketone is hexafluoroacetone and the ethylenically unsaturated compound is tetrafluoroethylene.

14. An addition copolymer of claim 1 wherein the polyfluoroketone is hexafluoroacetone and the ethylenically unsaturated compound is methyl methacrylate.

15. An addition terpolymer of claim 1 wherein the polyfluoroketone is hexafluoroacetone and ethylenically unsaturated compounds are tetrafluoroethylene and vinylidene fluoride.

16. An addition terpolymer of claim 1 wherein the polyfluoroketone is hexafluoroacetone and ethylenically unsaturated compounds are chlorotrifluoroethylene and vinylidene fluoride.

17. The process of producing an addition copolymer of claim 1 which comprises reacting, in the presence of a free radical generator and at a temperature in the range $-80$ to $250°$ C., (A) at least one polyfluoroketone of the formula $$X-CF_2-\overset{O}{\underset{\|}{C}}-CF_2-X'$$

wherein X and X' are selected from the group consisting (1), individually, of hydrogen, fluorine, chloride and bromine, and perfluoroalkyl, $\omega$-hydro-, $\omega$-chloro-, $\omega$-bromo-, and $\omega$-alkoxyperfluoroalkyl of up to 18 carbons and (2), jointly, of haloperfluoroalkylene of 1–3 carbons; and (B) at least one ethylenically unsaturated compound of the group consisting of cycloalkenes of up to 7 ring carbons and alkenes of the formula ZZ'C=CYY' wherein:

Z and Z' are the same or different and are selected from the group consisting of hydrogen and halogen of atomic number 9 to 35; and Y and Y' are the same or different and are selected from the group consisting of: hydrogen; halogen of atomic number 9 to 35; monovalent aromatic hydrocarbon of up to 7 carbons; alkyl of up to 18 carbons; nitrile;

—O—CO—(CH$_2$—CH$_2$)$_n$—

CO—O—CH=CH$_2$ and

—CO—O—(CH$_2$—CH$_2$)$_n$

—O—CO—CH=CH$_2$ wherein $n$ is 1 to 6; allyloxycarbonyl; RCO—, ROCO—, RO—, and RCOO—, where R is alkyl of up to 18 carbons; and —CONR'R'', where R' and R'' are hydrogen or alkyl of up to 7 carbons.

18. The process of claim 17 wherein the reactants include, additionally, a member of the group consisting of carbon monoxide, sulfur dioxide, maleic anhydride and fumaronitrile.

19. A manufacture formed from a solid addition copolymer of claim 1.

20. A self-supporting film formed from a solid addition copolymer of claim 1.

21. An addition terpolymer of claim 1 wherein the polyfluoroketone is hexafluoroacetone and ethylenically unsaturated compounds are tetrafluoroethylene and ethylene.

References Cited

UNITED STATES PATENTS 2,988,537   6/1961   Wiley _____ 260—67

WILLIAM H. SHORT, *Primary Examiner.*

C. A. WENDEL, H. D. ANDERSON,

*Assistant Examiners.*

UNITED STATES PATENT OFFICE
CERTIFICATE OF CORRECTION

Patent No. 3,342,777                                        September 19, 1967

Edward George Howard, Jr.

It is hereby certified that error appears in the above numbered patent requiring correction and that the said Letters Patent should read as corrected below.

Column 11, lines 7 and 8, for "monopoly", each occurrence, read -- monoply --; column 12, line 11, strike out "and 5%-$C(CF_3)_2$-O- units"; line 36, for "-/($CF_3CH_2$-" read -- -/(-$CF_3CH_2$- --; line 46, for "$CF_2=CF_2$)/" read -- $CF_2=CH_2$)/ --; line 58, for "+-$CF_2F_2$-)" read -- +-$CF_2CF_2$-) --; column 13, line 34, for "tetrafluoroethane" read -- tetrafluoroethylene --; column 16, line 72, for "-CON′R″ " read -- -CONR′R″ --; column 18, line 7, for "ride" read -- rine --.

Signed and sealed this 22nd day of October 1968.

(SEAL)
Attest:

EDWARD M. FLETCHER, JR.                      EDWARD J. BRENNER
Attesting Officer                                Commissioner of Patents